E. ROSE.
RESILIENT WHEEL.
APPLICATION FILED MAR. 27, 1914.
1,116,491.
Patented Nov. 10, 1914.
2 SHEETS—SHEET 2.
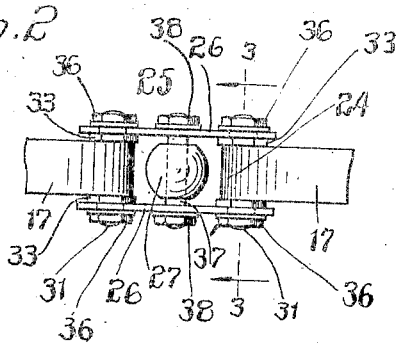
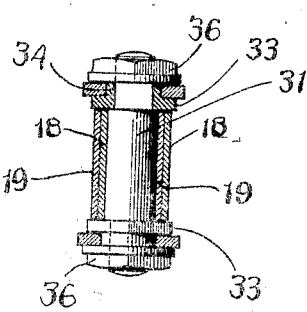
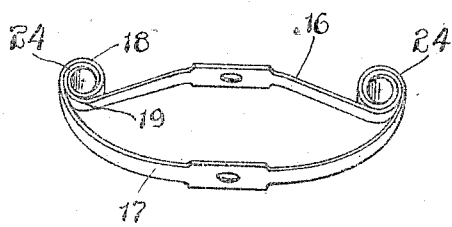
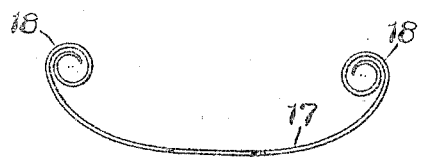
WITNESSES:
INVENTOR
Edward Rose
BY
ATTORNEY

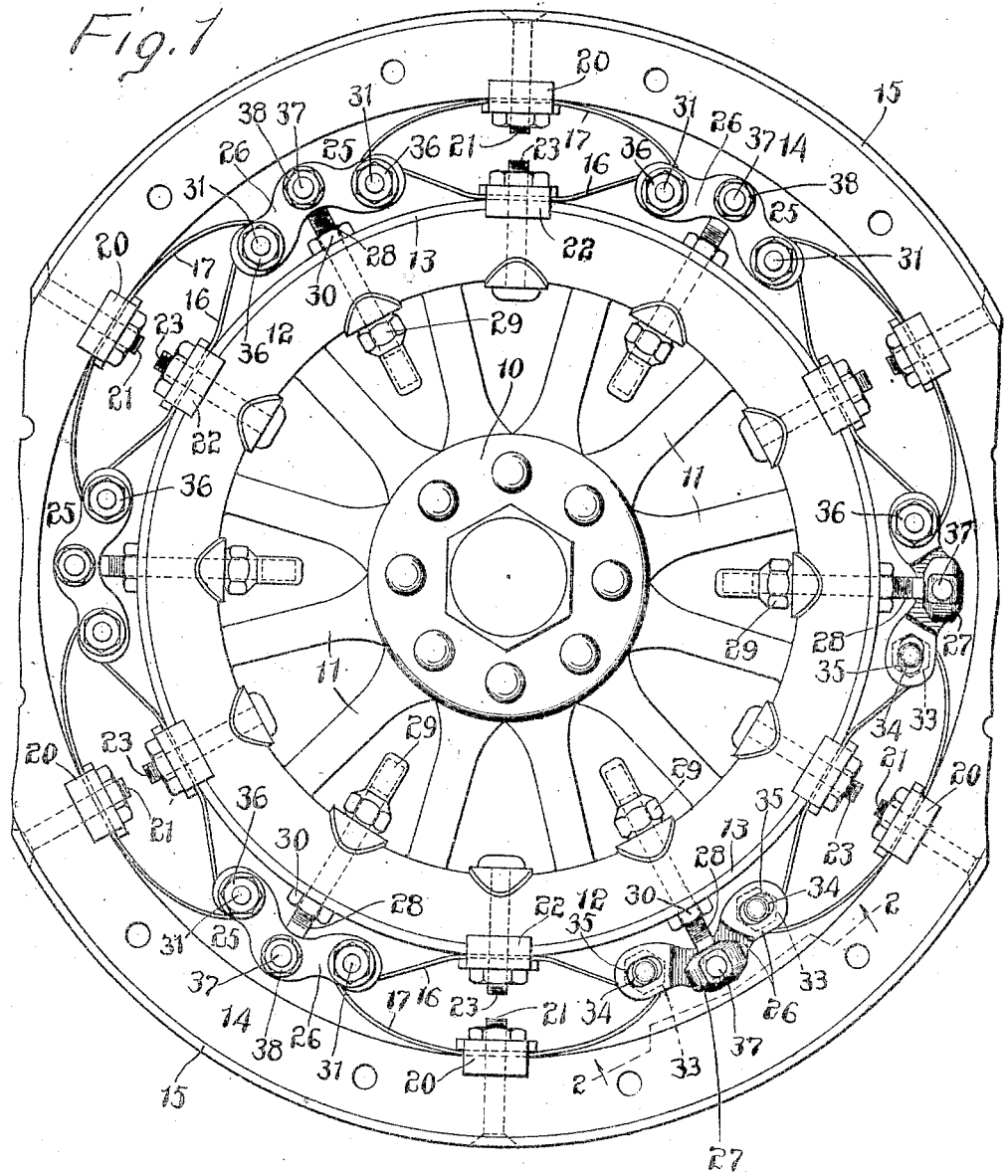

UNITED STATES PATENT OFFICE.

EDWARD ROSE, OF RYE, NEW YORK, ASSIGNOR TO THE ROSE AUTO. SPRING WHEEL COMPANY, A FIRM CONSISTING OF EDWARD ROSE, PHILIP NYGOOD, AND WILLIAM D. FOSTER, ALL OF RYE, NEW YORK, AND MAX EPSTEIN, OF MAMARONECK, NEW YORK.

RESILIENT WHEEL.

1,116,491.  Specification of Letters Patent.  Patented Nov. 10, 1914.

Application filed March 27, 1914.  Serial No. 827,619.

*To all whom it may concern:*

Be it known that I, EDWARD ROSE, a citizen of the United States, residing at Rye, county of Westchester, State of New York, have invented an Improvement in Resilient Wheels, of which the following is specification.

This invention has for its object to provide a durable and relatively inexpensive resilient wheel adapted for general use, as upon motor trucks, touring cars, limousines and lighter vehicles, which will render the use of pneumatic tires unnecessary and will possess the advantages as regards resilience and ease of riding of the best pneumatic tires without the disadvantages of punctures and blow-outs and at a greatly reduced expense. These results I accomplish by the use of a novel construction and arrangement of springs and rockers which insures that every spring in the wheel will at all times be carrying a portion of the load and doing its share of work in absorbing the shocks of travel and in contributing to the easy riding qualities of the vehicle upon which the wheel is used.

With these and other objects in view I have devised the novel resilient wheel which I will now describe, referring to the accompanying drawings forming a part of this specification and using reference characters to indicate the several parts:

Figure 1 is an elevation, partly broken away, of the wheel complete with the exception of a cushion tire of ordinary construction; Fig. 2 a detail elevation as seen from the line 2—2 in Fig. 1, looking in the direction of the arrows; Fig. 3 a section on an enlarged scale on the line 3—3 in Fig. 2, looking in the direction of the arrows; Fig. 4 a perspective of one of the springs detached, and Figs. 5 and 6 are elevations of the members of a spring detached.

10 denotes a hub, 11 spokes, 12 an inner felly, 13 an inner tire which is preferably provided for the purpose of giving additional strength, 14 an outer felly and 15 an outer tire outside of which a cushion tire (not shown) of ordinary construction is secured in any suitable manner. These parts may all be of the ordinary or preferred construction and may be greatly varied without departing from the principle of the invention, the novelty of which consists in the construction and arrangement of the springs and rockers between the fellies, the inner tire not being an essential feature of the invention.

The springs comprise members 16 and 17 which are bowed away from each other in the manner of an ordinary elliptic spring. Member 17 is provided at each end with a coil 18 and member 16 is provided at each end with a coil 19, said coils 18 being adapted to receive and interlock with coils 19, as clearly shown in Fig. 4, the mode of assembling being to place the members in superposed relation and then to press coils 19 into interlocking engagement with coils 18. Members 17 are secured to the outer felly by means of clips 20 and bolts 21 and members 16 are secured to the inner felly by clips 22 and bolts 23. For convenience in description I will term the interlocking coils of the spring members eyes and indicate them by 24. The eyes of the springs are pivoted to rockers indicated as a whole by 25. Each rocker consists of two plates 26 which are pivoted on opposite sides of the head 27, of a bolt 28 which passes through the inner felly and is provided at its inner end with a cap nut 29. The pivot pin 37 is shown as passing through the head and the plates and retained in place by nuts 38. A set nut 30 engaging the inner tire, or the outer face of the inner felly when said tire is omitted, retains the bolt against endwise movement. The springs may be adjusted to any required tension by loosening the set nuts and turning the cap nuts in either direction, as may be required, the parts being then locked in place by tightening up the set nuts again. 31 denotes shouldered studs, which pass through the eyes. The shoulders of the studs are engaged by nuts 33 provided with sleeves 34 which engage slots 35 in plates 26. Nuts 36 engaging the ends of the shouldered studs retain the parts in place. As these nuts engage the ends of sleeves 34 there can be no binding pressure on the plates of the rockers. Nuts 33 likewise bear against the shoulders on the studs and prevent binding pressure on the eyes of the springs.

The operation of the springs and rockers in use will be obvious. As the wheel rotates and is subjected to the blows of use, the load carried by the wheel will of course rise and fall, the effect of which is to cause the rockers to tilt and to transmit the strain of the load from spring to spring so that every spring in the wheel will at all times be carrying its due proportion of the load and the resilience of all of the springs will be utilized in carrying the load and taking up the shocks of travel.

Having thus described my invention I claim:

1. A resilient wheel comprising an inner felly, an outer felly, elliptic springs comprising half elliptic members between said fellies, rockers between adjacent springs to which the ends of said springs are pivoted, and means acting on the rockers for adjusting the tension of the springs.

2. A resilient wheel comprising inner and outer fellies, elliptic springs comprising half elliptic members attached at their midlength to said fellies respectively, the ends of said members being connected and comprising eyes, rockers pivoted intermediate the springs to which the eyes of contiguous springs are pivoted and means acting on the rockers for adjusting the tension of the springs.

3. A resilient wheel comprising inner and outer fellies, elliptic springs comprising half elliptic members attached to said fellies respectively, each end of each member being provided with a coil and the coils of the respective members interlocking to form eyes, and rockers pivoted to one of the fellies intermediate the springs to which the eyes of contiguous springs are pivoted.

4. A resilient wheel comprising inner and outer fellies, elliptic springs comprising half elliptic members attached to said fellies respectively, said members being provided at their ends with interlocking coils to form eyes, rockers pivoted to one of the fellies intermediate the springs, shouldered studs passing through the eyes and having sleeved nuts on which the rockers are pivoted and other nuts engaging the ends of the studs to retain the parts in place.

5. A resilient wheel comprising inner and outer fellies, elliptic springs comprising half elliptic members attached to said fellies respectively, eyes at the ends of said springs, rockers to which the eyes of contiguous springs are pivoted, said rockers comprising plates, bolts engaging the inner felly and having heads to which the plates of the rockers are pivoted and means on said bolts for moving them inward or outward to vary the tension of the springs.

6. A resilient wheel comprising inner and outer fellies, elliptic springs comprising half elliptic members attached at their midlengths to said fellies respectively and having eyes at their ends, bolts passing through the inner felly and having heads lying between the ends of adjacent springs and rockers comprising plates pivoted on opposite sides of said heads, the eyes of contiguous springs being pivoted between the ends of the plates of the rockers and nuts on said bolts for locking them in place after adjustment.

7. In a resilient wheel, the combination with inner and outer fellies, of elliptic springs between said members, rockers pivoted at their mid-lengths to the inner felly to which the ends of contiguous springs are pivoted and means acting on the rockers for adjusting the tension of the springs.

8. In a resilient wheel, the combination with inner and outer fellies, of elliptic springs between said fellies and rigidly secured thereto and adjustable rockers intermediate the springs to which the springs are connected.

9. In a resilient wheel, the combination with inner and outer fellies, of elliptic springs comprising members secured to the inner and outer fellies respectively, eyes at the ends of said springs, rocker arms intermediate the springs to which the eyes of contiguous springs are pivoted and adjustable bolts having heads to which the rocker arms are pivoted.

In testimony whereof I affix my signature in presence of two witnesses.

EDWARD ROSE.

Witnesses:
PHILIP NYGOOD,
MAX EPSTEIN.